United States Patent [19]

Mitchell et al.

[11] 4,285,735

[45] Aug. 25, 1981

[54] FRUCTOSE POLYMER MIXTURE

[76] Inventors: William A. Mitchell, 175 Jacksonville Rd., Lincoln Park, N.J. 07035; Charles E. Mitchell, 1336 Woodcrest Ct., Fort Collins, Colo. 80526; Pat R. Mitchell, 446 N. Powers, Manteca, Calif. 95336

[21] Appl. No.: 128,978

[22] Filed: Mar. 10, 1980

[51] Int. Cl.³ .............................................. C13L 3/00
[52] U.S. Cl. ...................................... 127/29; 127/34; 127/43; 536/1
[58] Field of Search ....................... 127/43, 34, 53, 41, 127/29

[56] References Cited

U.S. PATENT DOCUMENTS 2,834,694  5/1958  Hill .......................................... 127/41

OTHER PUBLICATIONS

Chemical Abstracts, 66:12104n (1967).
"Methods in Carbohydrate Chemistry", R. L. Whistler, ed., vol. V, pp. 157–158, Academic Press, New York, 1965.
"Advances in Carbohydrate Chemistry," W. W. Pigman et al., eds., vol. 2, pp. 253–255, Academic Press, New York, 1946.

*Primary Examiner*—Sidney Marantz

[57] ABSTRACT

A process for making a fructose polymer mixture containing chiefly inulin and inulides with minor amounts of impurities is based on the finding that inulin is in a soluble metastable state at room temperature as it exists in the dahlia tuber. Novel steps in the process are the separation, without the use of heat or adding water, of the water soluble from the ground dahlia tuber within about 10 minutes after grinding, followed by separation by coagulation of protein color and flavor bodies by heating at the boiling temperature from 3 to 10 minutes. No chemical defecating agent, such as lime water is used or required. The resulting clear extract is concentrated to 40% to 70% solids. Dry product is recovered by crystallizing the concentrated extract at 1° to 15° C. The product differs from inulin in that the product, in addition to inulin, also contains inulides, protein, color, flavor bodies, and minerals.

9 Claims, No Drawings

FRUCTOSE POLYMER MIXTURE

SUMMARY

This invention relates to a fructose polymer mixture containing chiefly inulin and inulides (fructose polymers). The mixture can be obtained from the roots or tubers of the compositae such as the dahlia by a process based on the following two discoveries:

1. That inulin although insoluble in room temperature water when isolated, is soluble as it exists in a metastable solution in the tuber. Our discovery of the existence of the metastable inulin solution makes it possible to separate the fructose polymers from insoluble fiber matter without the addition of water or heat. If water and especially hot water is used (as has been done in the past), additional plant material will be extracted along with the inulin-inulides. These extracted materials are difficult to separate from the desired product once they are put into solution. In addition, if water is added to extract the inulin polymer mixture it will have to be removed later by evaporation which is an additional expense.

2. That most of the soluble protein, color, and flavor bodies as well as some of the minerals and carbohydrates can be removed by coagulating the protein at the boiling temperature after the insolubles have been removed. Most of the color and flavor bodies are trapped in the protein coagulum and in this way can be separated from the soluble fructose polymers.

The fructose polymer mixture can be prepared as a concentrate of from 40% to 70% solids or as a dry crystalline mixture.

BACKGROUND

Inulin was first discovered by Rose in 1804. Analogous to starch, which is a glucose polymer, inulin is chiefly a fructose polymer. For over 100 years inulin has been looked upon as a source of fructose sugar. Purity of recovered inulin over these years was one of the chief concerns of researchers. Even minor amounts of contaminating material would interfere with the crystallization of fructose once the inulin was hydrolyzed. For this reason the past literature in this field contains many references to complex and lengthy methods for the extensive purification of inulin from many sources. It occurred to us that for use as a food ingredient impurities in an inulin preparation would have little significance and that our fructose polymer mixture could well be used in food preparations. Inulin bearing plants such as the root of the Jerusalem Artichoke have been consumed as a human food delicacy for many years.

OBJECTIVE

It is the objective of this invention to produce a commercial fructose polymer mixture by a novel process which requires no addition of water or heat to separate the fructose polymers from the insoluble plant materials. By heating the soluble extract obtained in the above separation to the boiling temperature, most of the protein, color and flavor bodies and some minerals and carbohydrates can be separated from the desired fructose polymers which remain in solution. Furthermore a 40% to 70% concentrate of the fructose polymers can be prepared which can then be incorporated with other food materials to make desirable food textures. Also the fructose polymer mixture can be recovered as a dry crystalline product which can be blended with food materials.

GENERAL INFORMATION

In the past hot water was usually used in the recovery of inulin from raw materials. In addition salts and especially heavy metal salts were employed to keep non-inulin material from going into solution. Heat was used because it was well known that recovered normal inulin was insoluble in cold water. The practical work of the past concerned itself with the production of pure inulin which was to be converted to fructose. Inulin purity was a necessity for it was difficult to crystallize inulin in the presence of even small amounts of impurities.

Our concept to use fructose polymers in food preparations does not require the same degree of purity needed for fructose preparation. It is our discovery that inulin is present in the root or tuber of the dahlia in a metastable soluble form. Therefore, in our extraction process for the separation of water solubles the addition of water or heat is not necessary or desirable. Furthermore, it was discovered that simply boiling the soluble extract of the first step (above) would coagulate the protein and also sweep down color and flavor bodies as well as some minerals and food carbohydrates. We prefer to operate without the use of chemical additives although pH changes in the extract and the use of preservaties are not excluded. Our process is one chiefly of physical separation.

To make our product it is necessary first to remove the water insolubles. This is done by grinding the scrubbed tuber in any conventional hammer mill or grinder. A particle size such as particles passing through a 10-mesh screen is suitable for making the separation. The slurry produced on grinding is immediately (less than 10 minutes from the grinder) filtered and pressed through filter cloth (such as the Orlon cloth used in apple cider pressing) to remove fibrous cellulose and other insolubles. We have found that the separation of the fiber material from the soluble solids of the ground tuber has to be carried out very soon after grinding. Failure to do so will result in loss of inulin material by crystallization as well as plugging of the separation system making the separation impossible. Our discovery that naturally occurring inulin is in a metastable solution, and knowing the nature of this stability makes it possible to carry out a successful separation of the inulin-inulides from the insoluble fiber.

From the pressing operation a light colored extract of the soluble solids is obtained. Next comes the important step for the removal of most of the protein, color, flavor bodies, and some minerals and carbohydrates. This separation is carried out by heating the soluble extract for from 3 to 10 minutes at the boiling temperature.

The protein coagulum which is first formed contains air to such a degree that the coagulum floats on the surface of the extract. If desired the floating coagulum can be removed with a screen. However, on standing, the coagulum can be recovered by decantation, centrifugation or filtration. The light brown soluble extract is now ready for concentration to between 40% and 70% solids. Here again, we have the advantage of not having added water during the extraction step which at this point would have to be removed. Conventional evaporators can be used at room pressures or under diminished pressure to concentrate the liquors.

To obtain the dry crystalline material the above concentrate (40% to 70% solids) is cooled to between 1° and 15° C., then seeded with a few crystals of inulin and slowly stirred. The mass is allowed to crystallize for about 12 hours. A semi-solid crystalline material is obtained. The mother liquors are removed by centrifugation and the fructose polymer mixture tray dried at temperatures between 35° and 70° C. to a moisture content of about 10 percent.

DESCRIPTION OF INVENTION AND EXAMPLE

Having outlined the steps in our invention we will now give in detail, by example, the process for producing our fructose polymer mixture. We find the dahlia tuber is the preferred source material for making our product. The composition of the dahlia as with most natural materials is variable, however an average composition is shown below.

TABLE 1

| Average Dahlia Tuber Composition | | |
|---|---|---|
| Moisture | | 79.5% |
| Solids | | 20.5% |
| Composition of Solids | | |
| | As Is | Dry Basis |
| Water Solubles | 17.0% | 83% |
| Water Insolubles | 3.5% | 17% |
| | 20.5% | 100% |
| Composition of Water Solubles | | |
| Carbohydrates containing fructose | | 79.4% |
| Proteins, color and flavor bodies and other carbohydrates | | 20.6% |
| | | 100.0 |

Freshly dug dahlia tubers were washed and scrubbed to remove outer fiber. The solids content was determined by drying in an oven at 110° C. for three hours and found to be 20.0%. One kilogram of the washed tubers at 15° C. was weighed then ground in a Waring blender so that all particles passed through a 10-mesh screen. The slurry produced was immediately filtered and pressed through an Orlon filter cloth. An extract of 750 cc was obtained containing 16.9% soluble solids. The light tan filtrate was put in a liter beaker and boiled over a moderate electric hot plate for 5 minutes. When the temperature of the extract reached 70° C. a dark green coagulum formed which increased in amount and turned darker as the boiling point was reached. The hot mixture was allowed to stand for 30 minutes when most of the protein coagulum settled leaving a clear supernatant which was decanted through a muslin filter cloth. A yield of 590 cc was obtained with a solids content of 17.9%. The clear filtrate in a liter basket was concentrated at room pressures to a 60% solids content over a moderate gas flame. On cooling to room temperature the fructose polymer concentrate was obtained as a semi-solid crystalline mass. Taste tests showed the concentrate to be non-sweet indicative of the absence of simple fructose sugar.

Recovery of the Dry Crystalline Fructose Polymer Mixture

To obtain the dry crystalline product the fructose polymer at 60% concentration was seeded with inulin crystals then cooled to 6° C. for 12 hours with intermittent stirring. A semi-solid crystalline mass was obtained. Most of the mother liquors, containing chiefly inulides were removed through the use of a sintered glass filter stick employing vacuum. The moist crystalline mass was placed on aluminum trays and dried in a tunnel air dryer at 40° C. air temperature to 10% moisture. Taste test showed the dry crystalline product to have a non-sweet bland taste.

An analysis of the crystalline product for reducing groups showed it to have one fructose reducing group for a weight of 3,000 grams. This low reducing value shows that there is little or no non-polymeric sugar present in the product. The inulides crystallize with difficulty so the above fructose polymer mixture is cheifly inulin.

Variations can be made in proportions, procedures and materials without departing from the scope of this invention which is defined by the following claims:

We claim

1. The process for extracting a fructose polymer mixture dispersion from dahlia tubers without adding water or heating, comprising grinding scrubbed dahlia tubers at temperatures of 2° to 40° C. to about a 10 mesh particle size; and then separating the water solubles from the insoluble fibrous material within no longer than about ten minutes.

2. The process of claim 1 wherein the separation of the water solubles from the insoluble material is accomplished by pressing or centrifuging.

3. The process for separating most of the protein, color and flavor bodies as well as some carbohydrates and minerals from the water soluble extract of claim 1 comprising boiling said water soluble extract for 3 to 10 minutes, separating by decanting or centrifuging from the resulting coagulated protein mixture, a clear soluble extract containing chiefly inulin and inulides; and then concentrating the clarified extract to 40% to 70% solids by evaporation under atmospheric or reduced pressures.

4. A 40% to 70% concentrated slurry of fructose polymer mixture prepared by the process of claim 3.

5. The process for making crystalline fructose polymer mixtures in which the concentrated fructose polymer mixture of claim 3 is cooled to 1° to 15° C., seeded with inulin crystals and allowed to crystallize for about 12 hours, then removal of mother liquors by centrifugation followed by drying the crystalline fructose polymer mixture between 35° and 70° C.

6. The dry fructose polymer mixture prepared by the process of claim 5.

7. The process for preparing a crystalline fructose polymer mixture comprising:

(a) directly grinding scrubbed dahlia tubers at a temperature from 2° to 40° C., so as to obtain a 10 mesh particle size, said grinding being carried out without the addition of water;

(b) separating the water solubles from the insoluble fibrous material resulting from step (a) within about 10 minutes of the grinding;

(c) boiling the extract for 3 to 10 minutes whereby protein, color and flavor bodies are coagulated;

(d) separating the coagulated matter to produce a clarified extract;

(e) concentrating the clarified extract by evaporation to 40% to 70% solids under atmospheric or reduced pressures;

(f) seeding the concentrated extract with inulin crystals;

(g) cooling the seeded extract to 1° to 15° C. and maintaining the extract in said temperature range for approximately 12 hours;

(h) separating the resulting mother liquor from the resulting fructose polymer mixture; and (i) drying the crystalline fructose polymer mixture at between 35° and 70° C.

8. The process of claim 7 wherein the separation of step (b) is accomplished by pressing or centrifuging.

9. The process of claim 7 wherein the separation of step (d) is accomplished by decantation or centrifugation.

* * * * *